March 20, 1928. 1,662,834
D. I. REITER
FASTENING DEVICE
Filed April 9, 1927
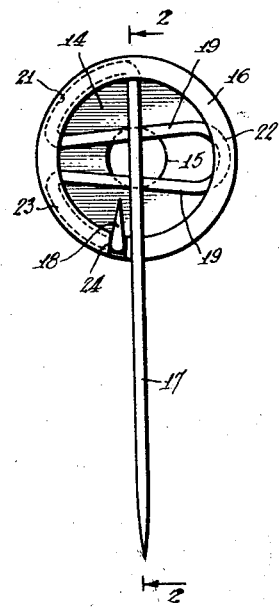
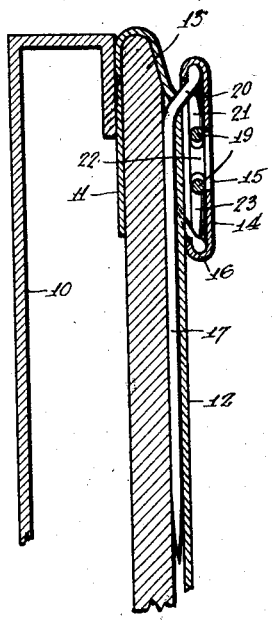
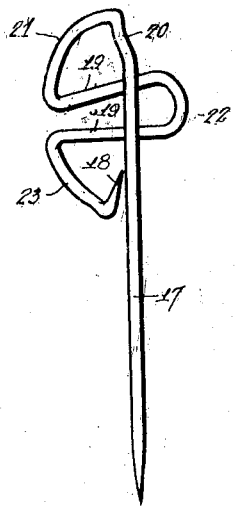
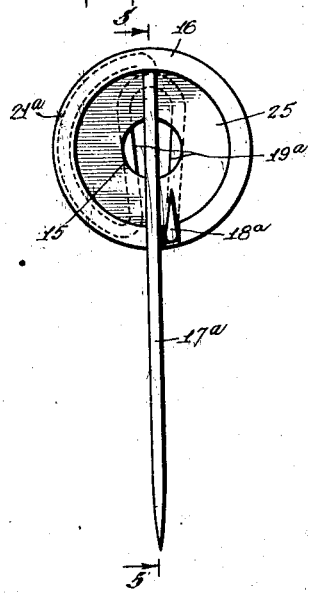
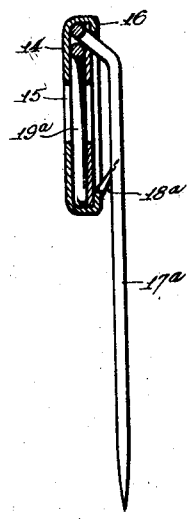
WITNESSES
INVENTOR
Daniel I. Reiter.
BY
ATTORNEY Patented Mar. 20, 1928.

1,662,834

UNITED STATES PATENT OFFICE.

DANIEL I. REITER, OF NEW YORK, N. Y.

FASTENING DEVICE.

Application filed April 9, 1927. Serial No. 182,447.

The present invention is concerned with the provision of a fastening device adapted to serve the same general purpose, and of the same general character as the fastener disclosed in Patent No. 1,619,764 granted to me on March 1, 1927.

More specifically the fastener is of the character in which a female pin fastener is provided by an apertured cap and a length of spring wire, and represents an improvement over the female fastener element disclosed in my copending application Serial No. 164,284 filed Jan. 28, 1927.

This type of fastener may have a wide range of usefulness, but is primarily adapted for securing dust covers to the upholstery of automobile seats and backs.

Since the advent of steel body construction in automobile vehicles, it has become common practice to secure the edges of the velour seat coverings between the steel body frame and a plate which is connected to the frame by concealed securing devices. These plates are generally of some hard substance unsuitable for the reception of nails or similar securing devices. In consequence the problem of attaching a dust cover such for instance as an ordinary cretonne cover over the upholstery has become a serious one. The covers themselves are cheap enough, but it is very difficult to find any way of attaching them.

In accordance with the present invention I have provided a fastening device adapted to be attached directly to the velour or to the outer covering of the upholstery, said fastening device carrying one element of a separable fastener, and the other element of the fastener being carried by the dust cover.

Preferably the fasteners which I utilize include pin portions adapted to pass through the velour and lie between the velour and the hard backing plate. Connected to the pins are plate portions which overlie the outer surface of the velour and carry either the male or female elements of snap fasteners. The plates are associated with prongs which enter the velour and coact with the pins to prevent twisting or slipping of the fastening devices from proper position.

In my copending application above referred to, a single length of wire was bent to provide a head portion secured to an apertured plate member, this head portion including spreadable spring arms arranged under the aperture in the plate for the reception of a stud on a cooperating fastener member. The same wire also provided a pair of aproximately parallel pins disposed radially relative to the plate adapted to penetrate and lie behind a fabric and spaced from the plate to accommodate a portion of the fabric between the pin and plate.

In accordance with the present invention, the same length of wire defines the head portion with its spreadable stud-engaging arms as well as a spur element adapted to prevent retraction of the pin portion of the fastener from a fabric. If desired, the pin, preferably a single pin, may also be integral with the head and spur. I thus effect economy of wire, simplify the construction, and use a single wire element to perform the fourfold function of pin, head, spring socket, and spur.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in rear elevation of a fastener embodying the present invention.

Fig. 2 is a longitudinal sectional view therethrough showing the same in applied position.

Fig. 3 is a perspective view of the wire element used in the pin of Fig. 1.

Fig. 4 is a view similar to Fig. 1, but illustrating a slight modification.

Fig. 5 is a sectional view on the line 5—5 of Fig. 4.

Referring first to Fig. 2 of the drawings, I have used the numeral 10 to designate a part of the ordinary steel frame construction of an automobile body. The upper edge 11 of a piece of velour 12 or similar upholstering material is clamped between the frame 10 and a relatively stiff frame plate 13, members 10 and 13 being connected by concealed fastening means (not shown). The fastener of the present invention finds one of its preferred uses as a means for attaching dust covers to this type of upholstery.

In Fig. 1 it will be noted that the fastener includes a head or cap portion in the nature of a plate 14 having a central opening 15 therein and provided with a rolled marginal flange 16. A single length of wire is bent to provide at one end a pin 17, at its other end a spur 18, and at its intermediate portion a skeleton attaching element or cap-engaging head which includes a pair of spaced spreadable spring arms 19 underlying the opening 15. When a stud member is inserted through the opening in the cap, the arms 15 are spread apart and snapped around the neck of the stud.

The unpointed end of the pin 17 is offset as at 20 to space the pin from the plate 14, the pin being parallel and radially disposed relative to the plate. From the offset 20, the pin-forming wire is bent into an approximately arcuate run 21 underlying the flange 16. The wire is then bent into substantially U-shape, the legs of the U, forming the spring arms 19, and the intermediate portion 22 of the U underlying the flange 16 at a point remote from the run 21. A second arcuate run 23 of the wire forming a continuation of the opposite spring arm 19 also lies under the flange 16 and terminates in the spur portion 18, the latter projecting through a recess 24 in the flange 16. Thus, at three points the wire lies under the flange so that the head consisting of the two runs 21, 23 and the central U-shaped arm-forming portion is securely retained within the cap. Relative rotation of the head and cap is prevented by the spur 18. When the fastener element is applied to the upholstery as shown in Fig. 2, the pin 17 penetrates the upholstery 12 and lies between the upholstery and plate 13. Spur 18 digging into the upholstery or velour 12 retards any accidental retrograde movement of the pin.

In Figs. 4 and 5 I have illustrated a modification in which the wire is again bent to form a pin 17$^a$, spreadable arms 19$^a$, and a spur 18$^a$. Here however, the spreadable spring arms instead of being disposed approximately at right angles to the pin 17 lie in approximate parallelism with the pin. The arcuate run of wire 23 between the spur and one of the arms is omitted, and an arcuate run 21$^a$ corresponding to the run 21 of Fig. 1 extends around approximately half the circumference of the plate. With this form of the invention the three point wire and flange engagement of Fig. 1 is lost, and I may find it necessary to use an apertured washer such as 25 which lies under the plate flanges and retains the wire head against twisting movement relative to the plate.

Obviously various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. As a new article of manufacture, a female fastener element of the class described including an apertured plate and a pin for attaching the plate to a fabric, a single length of wire connected to the plate and bent to provide a fabric-engaging spur and a pair of stud receiving spring arms underlying the opening.

2. As a new article of manufacture, a female fastener element of the class described including an apertured plate and a pin for attaching the plate to a fabric, a single length of wire connected to the plate and bent to provide a fabric-engaging spur and a pair of stud receiving spring arms underlying the opening, one end of said wire being pointed and extending radially beyond the edge of the plate and constituting said pin.

3. As a new article of manufacture, a female fastener element of the class described including an apertured plate and a pin for attaching the plate to a fabric, a single length of wire connected to the plate and bent to provide a fabric-engaging spur and a pair of stud receiving spring arms underlying the opening, one end of said wire being pointed and extending radially beyond the edge of the plate and constituting said pin, the other end of the wire being pointed to define said spur and lying within the confines of the plate.

4. As a new article of manufacture, a female fastener element of the class described including an apertured plate and a pin for attaching the plate to a fabric, a single length of wire connected to the plate and bent to provide a fabric-engaging spur and a pair of stud receiving spring arms underlying the opening, the plate being flanged to engage the wire and having a recess in the flange through which the spur extends to prevent relative rotational movement of the spur and plate.

5. As a new article of manufacture, a fastener including a flanged plate having a central opening therein, a single length of wire bent to provide at its intermediate portion a head lying under the flanges, said head including spreadable spring arms underlying the opening, one end of the wire being spaced from the plate and defining a pin, the other end of the wire interlocking with the flange to prevent relative rotation of the head and plate and constituting a spur preventing retraction of the pin from a fabric.

6. As a new article of manufacture, a female fastener element of the class described including a flanged plate having an opening therein, a wire bent to provide a pin portion and a head portion, the latter including spreadable spring arms lying under the opening, and a centrally apertured retainer plate holding the head in place, the edges of the retainer plate lying under the flange.

7. As a new article of manufacture, a single pin fastener of the class described, including a flanged head and a pin projecting radially therefrom for attaching the head to a fabric, a single length of wire bent to define at one end a pin, at its other end a fabric-engaging spur and at its intermediate portion a skeleton attaching element fitting under and retained by the flange of said head.

8. As a new article of manufacture, a single pin female fastener element of the class described, including an apertured flanged plate and a radially projecting pin for attaching the plate to a fabric, a single length of wire bent to provide at one end the pin and adjacent its other end a skeleton head portion, including wire runs underlying the plate flange and retained thereby, and a pair of stud receiving spring arms underlying the opening.

DANIEL I. REITER.